C. J. FIENHOLD.
LOCKING DEVICE FOR DUMP WAGONS OF THE END DUMP TYPE.
APPLICATION FILED MAR. 30, 1912.
1,060,976.
Patented May 6, 1913.
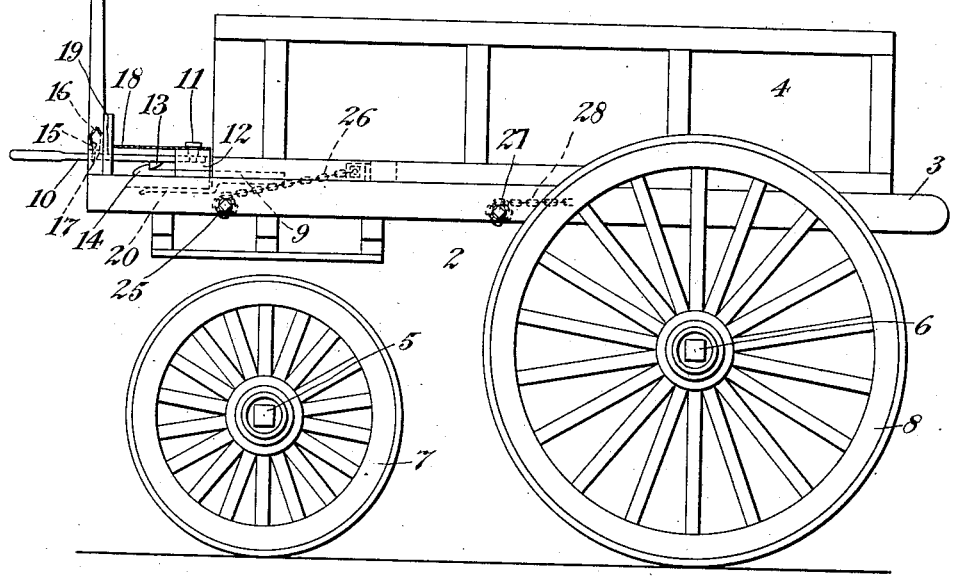
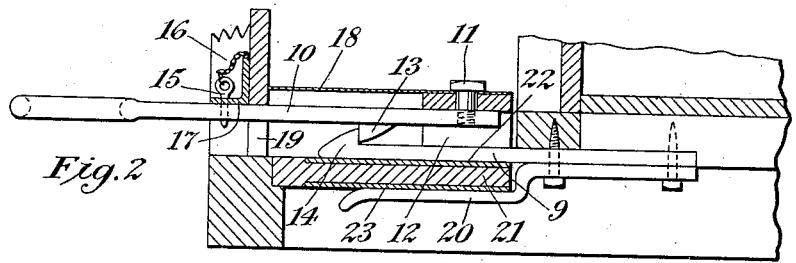
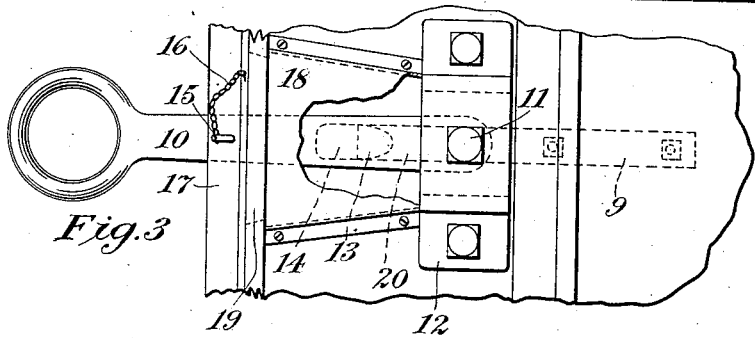

UNITED STATES PATENT OFFICE.

CHARLES J. FIENHOLD, OF BROOKLYN, NEW YORK.

LOCKING DEVICE FOR DUMP-WAGONS OF THE END-DUMP TYPE.

1,060,976. Specification of Letters Patent. Patented May 6, 1913.

Application filed March 30, 1912. Serial No. 687,407.

*To all whom it may concern:*

Be it known that I, CHARLES J. FIENHOLD, a citizen of the United States, and a resident of Brooklyn, in the county of Kings and State of New York, have invented certain new and useful Improvements in Locking Devices for Dump-Wagons of the End-Dump Type, of which the following is a specification.

This invention relates to a locking device for dump-wagons of the end-dump type, and the object of the invention is to provide a device for locking the dump-section of a wagon of this type to the wagon-body or frame when the parts are in their normal positions for receiving a load and for releasing the dump-section to permit it to be tilted when a load is to be discharged. Dump-wagons of this type as ordinarily constructed have a dump-section that slides on the wagon-frame toward the rear end of the wagon, and is tilted at a predetermined point at the end of such travel to dump the load at the rear of the wagon. A locking device adapted for use in connection with a wagon of this type should be so constructed as to be capable of holding the dump-section securely in place on the wagon-frame, and yet be releasable therefrom readily from the driver's seat. I prefer to employ for this purpose a latch device, one member of which is secured to the wagon-frame proper at the forward end thereof, and the other of which is secured to the dump-section at a point adjacent to the first member of the latch when the parts are in their normal positions, and to so combine the two members of the latch that one can be released readily from the other to free the dump-section from the driver's station.

In the drawings accompanying this specification I have illustrated a rear-end dump-wagon having applied thereto a latch device of the type just described, Figure 1 of which illustrates such a wagon and latch device in side elevation; Fig. 2 shows the latch device in detail and on an enlarged scale in vertical longitudinal section, and Fig. 3 shows said device in plan on the same scale, parts of the construction being broken away for clearness of illustration.

Similar characters designate like parts in all the figures of the drawings.

With the exception of the latching device and the elements coöperating directly therewith, all of the parts shown in the drawings are or may be of well-known type. The principal elements are the frame proper, designated generally by 2, which frame has the usual side pieces or sills, 3, on which the dump-section, 4, is mounted and adapted to slide. The frame of the wagon may be supported on front and rear axles, 5 and 6, carrying front and rear wheels, 7 and 8, in any usual manner. In this case the dump-section 4 is intended to be detachably secured at its forward end to the forward portion of the frame 2. For the purpose of making this connection I provide a latch device embodying two main elements. One of these is a detent, preferably hooked, carried by the dump-section, and the other is a detent, also preferably hooked, carried by the frame-work of the dump-wagon. Either of these parts may be movable relatively to the other to engage it with and release it from such other member of the latch. Here, however, the latch element or detent of the dump-section is in fixed relation with the dump-section while the latch element of the frame-work is pivotally mounted thereon so that it may be moved into and out of engagement with the corresponding part carried by the dump-section. The specific construction of each of these parts may also be varied within quite wide limits, but I prefer at the present time to use latch elements substantially similar to those shown at 9 and 10, the former of which is securely fastened to the dump-section at the forward end and under side thereof, while the latter is pivoted at 11 on a cross-piece, 12, of the frame-work immediately in advance of the forward end of the dump-section when said section is in its normal position for loading. The end of each latch element is hooked in this case, the hook of the part 9 extending upward while that of the part 10 extends downward into position for engagement with the first hook. Here the member 10 has a latch-lever pivoted at its rear end at 11 and having its forward end extending out to a point immediately in front of the forward end of the frame-work into position for operation by the driver either from his station on the wagon or from the ground. This latch-lever is intended to be swung about its pivot 11 in a horizontal plane to release the substantially vertical locking face of its hook, 13, from the corresponding locking face of the hook, 14, of the latch member 9 and permit rearward horizontal movement of the dump-section on the ways or sills 3.

The latch-lever 10 may be secured in its normal position in any suitable manner, as for example, by a locking-pin, such as 15, secured to a chain, 16, and adapted to pass through registering openings in an angle-iron or other suitable fixed part, 17, of the frame-work and in the latch-lever 10.

When the parts are in the positions shown in Figs. 2 and 3 the dump-section is locked to the frame of the wagon and cannot be moved toward the rear to tilt it and dump the load until the latch-lever is released and swung either to the right or to the left a sufficient distance to move the detent or hook 13 to a point where it is clear of the coöperating hook 14. It will be seen also that fixed parts of the wagon frame are in engagement with the upper side of the lever 10 at opposite sides of the latching point in all positions of said lever. The lever is thereby positively guided in a horizontal plane throughout its entire movement and the fixed parts of the wagon frame engaging with the lever at opposite sides of the latching point brace the lever and durability and strength are thereby insured.

In order that the operation of the latch may not be interfered with as the result of its getting clogged with sand, dirt, etc., a guard or casing is preferably placed over or around these parts, as shown at 18. This guard or casing may be of any suitable material and form provided it covers the parts and prevents the entrance of sand, dirt, etc., thereto. At its forward end provision must, of course, be made for the transverse movement of the latch-lever as it swings about its pivot from one side to the other. An opening to accommodate this movement is indicated at 19.

The latch devices just described are sufficient for the purpose of locking and releasing the dump-section of the wagon. It is desirable, however, to provide, in addition to this, means for preventing the tilting or dumping of the section 4 until it is run out to the limit of its rearward sliding movement on the sills or ways 3. In order to prevent the premature tilting of the dump-section, the latch 9 is shown herein as having in fixed relation therewith a part constituting essentially a fork of the latch, and forming with the main member of it a horizontal guide-way. This part is indicated at 20. It is shown as extending under a horizontal portion, 21, of the forward part of the frame-work while the main element of the latch 9 is in contact with the upper part of said element 21. The upper and lower sides of the frame member 21 are preferably protected against excessive wear by wear-plates, such as 22 and 23, with which the main member of the latch 9 and the forked portion 20 are in sliding contact. At its extreme forward end the part 20 is gradually curved to release the dump-section gradually and check its too sudden descent. It will be evident that while the dump-section is being run back to the limit of its rearward movement it will be impossible for it to tilt or dump so long as the part 20 is in engagement with the wear-plate 23, but that as soon as the curved free end of the part 20 is clear of said plate and of the frame member 21 the dump-section may be immediately tilted to discharge its load.

The various members of the latch device just described may be disposed in any proper position crosswise of the dump-wagon, but are illustrated herein as being located substantially in the central vertical longitudinal plane of the dump-wagon. The dump-section is intended to be run out and in on the frame-work in the well-known manner, the cranks, the shafts and chains of a well-known type of mechanism for this purpose being illustrated at 25—26 and 27—28.

What I claim is:

1. In a locking device for a dump-wagon, a pair of latch members secured respectively to the dump-section of the wagon and to the wagon-frame and having substantially vertical locking faces positioned and adapted when in engagement to prevent lengthwise movement of the dump-section toward the rear of the wagon-frame, and one of which latch members is pivoted at one end and extends away from the element of the wagon to which the other latch member is secured, said pivoted latch member being shiftable crosswise of the wagon into and out of locking engagement with the other member, and means for securing said latch members in their latched position.

2. In a locking device for a dump-wagon, a pair of substantially horizontal latch members one of which is secured to the forward end of the dump-section of the wagon and has an upwardly projecting hook and the other of which is a lever pivoted on the wagon-frame substantially at the transverse center of the forward end thereof and having a hook between its ends which hook projects below the horizontal plane of the body of said lever and is shiftable into and out of engagement with said first hook by a movement crosswise of the wagon, and means for securing the latch members in their latched position.

3. In a locking device for a dump-wagon, a pair of substantially horizontal latch members the first of which is secured to the forward end of the dump-section of the wagon and is movable with it lengthwise of the wagon-frame relatively to the other and has an upwardly projecting hook and the second of which is a lever pivoted on the wagon-frame substantially at the transverse center of the forward end thereof and having a hook between its ends which hook projects below the horizontal plane of the body of said lever and is shiftable into and out of engagement with said first hook by a movement crosswise of the wagon, means for securing the latch members in their latched position, and means for preventing tilting of the dump-section until it is run out to the limit of its longitudinal movement.

4. In a locking device for a dump-wagon, a pair of substantially horizontal latch members one of which is secured to the dump-section of the wagon and the other of which is pivotally mounted on the wagon-frame and is disposed above said first-mentioned latch member and is shiftable into and out of engagement therewith by a movement crosswise of the wagon, the fixed parts of the wagon-frame being in engagement with the upper side of said pivoted latch member at opposite sides of the latching point in all positions of the pivoted latch member, and means for securing the latch members in their latched position.

5. In a locking device for a dump-wagon, a pair of latch members the first of which is an elongated U-shaped guide and latch secured to the dump-section of the wagon and movable with it lengthwise of the wagon and normally straddling a fixed member of the wagon-frame and adapted to engage the upper and lower sides thereof and the second of which latch members is movable on and crosswise of the wagon-frame at the forward end thereof into and out of engagement with said first member of the latch, and means for securing the latch members in their latched position.

Signed in the borough of Brooklyn New York city in the county of Kings and State of New York this 21st day of March A. D. 1912.

CHARLES J. FIENHOLD.

Witnesses:
FRANK KILLE,
GEORGE GOLDBERG.

---

Copies of this patent may be obtained for five cents each, by addressing the "Commissioner of Patents, Washington, D. C."